US006455081B1

(12) United States Patent
Han et al.

(10) Patent No.: US 6,455,081 B1
(45) Date of Patent: Sep. 24, 2002

(54) INCORPORATION OF SOY PROTEINS IN CHEESE

(75) Inventors: Xiao-Cing Han, Naperville; Richard H. Lincourt, Mundelein, both of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/677,195

(22) Filed: Oct. 2, 2000

(51) Int. Cl.⁷ .................................................. A23C 9/12
(52) U.S. Cl. ............................ 426/36; 426/34; 426/44; 426/46; 426/580; 426/582
(58) Field of Search ........................... 426/582, 34, 36, 426/44, 46, 37, 38, 40, 42, 43, 580, 39

(56) References Cited

U.S. PATENT DOCUMENTS

| | | | |
|---|---|---|---|
| 3,857,970 A | * 12/1974 | Tsumura et al. ............... 426/46 |
| RE28,810 E | 5/1976 | Tsumura et al. ............... 426/46 |
| 3,982,025 A | 9/1976 | Hashimoto et al. ............ 426/46 |
| 4,080,477 A | 3/1978 | Tsumura et al. ............... 426/656 |
| 4,100,024 A | 7/1978 | Adler-Nissen ................ 195/29 |
| 4,284,656 A | 8/1981 | Hwa ........................... 426/641 |
| 4,303,691 A | 12/1981 | Sand et al. ................... 426/573 |
| 4,349,576 A | 9/1982 | Lehnhardt et al. ........... 426/582 |
| 4,376,127 A | 3/1983 | Lunde ......................... 426/46 |
| 4,435,438 A | 3/1984 | Lehnhardt et al. ........... 426/656 |
| 4,556,569 A | 12/1985 | Brander et al. ............... 426/104 |
| 4,882,180 A | 11/1989 | Takao et al. .................. 426/46 |
| 5,858,449 A | 1/1999 | Crank et al. ................. 426/656 |

OTHER PUBLICATIONS

Asahimatsu Koridofu Co., AN 80(04):G0274 FSTA, abstracting JP 5422498, 1979.*
Fuji Oil Co., AN 78(04):G0193 FSTA, abstracting JP 5231027, 1977.*

* cited by examiner

*Primary Examiner*—Leslie Wong
(74) *Attorney, Agent, or Firm*—Fitch, Even, Tabin & Flannery

(57) ABSTRACT

A method for preparing cheeses, preferably natural cheeses, containing significant levels of soy protein is provided. The process uses enzymes (preferably proteinase) to treat the soy ingredients and to form soy protein hydrolyzates. The enzyme-treated soy ingredients are complexable with casein micelles. After a heat treatment step to deactivate the enzymes, the soy protein hydrolyzate is added to a milk substrate which is then clotted, preferably using conventional rennet, to form curds and whey. After separating the curds and whey, the curd is converted to cheese using conventional cheese-making procedures. Without the initial enzyme treatment, the intact soy ingredients would interfere with milk clotting, thereby preventing the formation of a normal cheese curd. The partially hydrolyzated soy protein used in the present invention does not significantly interfere with milk clotting mechanisms. Cheeses containing up to about 30 percent soy ingredients can be obtained.

24 Claims, 1 Drawing Sheet

INCORPORATION OF SOY PROTEINS IN CHEESE

FIELD OF THE INVENTION

The present invention relates generally to a method for preparing cheeses, preferably natural cheeses, containing significant levels of soy protein. The process uses enzymes (preferably proteinase) to treat the soy ingredients and to form soy protein hydrolyzates. The enzyme-treated soy ingredients are complexable with casein micelles. After a heat treatment step to deactivate the enzymes, the soy protein hydrolyzate is added to a milk substrate which is then clotted, preferably using conventional rennet in combination with direct acidification or lactic acid-producing cultures, to form curds and whey. After separating the curds and whey, the curd is converted to cheese using conventional cheese-making procedures. Without the initial enzyme treatment, the intact soy ingredients would interfere with milk clotting, thereby preventing the formation of a normal cheese curd. Additionally, without the initial enzyme treatment, a significant portion of the intact soy ingredients would be lost with the whey. The partially hydrolyzated soy protein used in the present invention does not significantly interfere with milk clotting mechanisms. The partially hydrolyzated soy protein used in the present invention also tends to complex with casein, thereby leading to improved soy protein retention in the curd. Cheeses containing up to about 30 percent soy ingredients can be obtained.

BACKGROUND OF THE INVENTION

Natural cheese is generally made by developing acidity in milk and setting the milk with a clotting agent, such as rennet, or by developing acidity to the isoelectric point of the protein. The set milk is cut or stirred, preferably with heating, and whey is separated from the resulting curd. The curd may be pressed to provide a cheese block. Curing typically takes place over a lengthy period of time under controlled conditions.

The health benefits of soybeans have been known for some time. Along with a tendency to lower cholesterol levels, soybeans have recently been linked with, or suggested as having, a possible role in inhibiting cancerous or tumor cells. Thus, efforts have been made to incorporate soy into a wide variety of foods. There have been many efforts to produce soy-containing cheeses prepared both with and without milk product ingredients. It has generally been difficult to incorporate significant levels of soy protein in dairy-based cheese products. For example, U.S. Pat. No. Re. 28,810 (May 11, 1976) provides a soy cheese prepared without milk solids using an aldonic acid lactone or an uronic acid lactone coagulant. Flavor producing proteolytic enzyme (i.e., proteases) could be incorporated into the product before formation of the emulsion, to the emulsion prior to fermentation, or to the cooked curd. The resulting soy cheese is reported to have texture and body similar to natural cheeses.

U.S. Pat. No. 3,982,025 (Sep. 12, 1976) provides a soy cheese spread which is prepared by mixing a soy cheese with an edible oil or fat, a cheese emulsifying melting salt, and water at elevated temperatures to liquify and homogeneously emulsify the ingredients. The soy cheese is prepared by fermenting soy milk with a lactic acid-forming cheese starter culture. The soy cheese may also be treated with a proteolytic enzyme to accelerate the enzymatic degradation of soy globulin; the proteolytic enzyme may be added before fermentation or after cooking of the soy cheese curd. U.S. Pat. No. 4,080,477 (Mar. 21, 1978) provides a process cheese-like product containing soy cheese by mixing under high shear (1) casein-containing substances derived from animal milk, (2) a cheese emulsifying salt, and (3) soy cheese. The casein-containing substances include caseinates, dairy cheese, dairy cheese curd, whole milk solids, skim milk solids, and mixtures thereof.

U.S. Pat. No. 4,284,656 (Aug. 18, 1981) provides a process for producing a high protein, low-fat foodstuff by water extraction of protein from a defatted soy bean followed by coagulation of the protein to form curds and whey, and separation and washing of the curd product. The curd product can be mixed with or incorporated into cheese. U.S. Pat. No. 4,303,691 (Dec. 1, 1981) provides a proteinaceous food product (stimulated cheese) by blending (1) a soy protein selected from the group consisting of soy isolate, cold insoluble soy fraction, or mixtures thereof, (2) gelatin, (3) hydrocolloid gum, (4) fat, and (5) water.

U.S. Pat. No. 4,349,576 (Sep. 14, 1982) and U.S. Pat. No. 4,345,438 (Mar. 6, 1984) provide vegetable protein isolates, including soy protein isolates, which can be incorporated into imitation cheese products. The vegetable isolates are reported to be prepared under conditions which precondition the proteins so that they may be converted, upon heat treatment, into protein aggregates which simulate the hydrocolloidal attributes of caseinate. More specifically, soy isolates are reported to be utilized to replace about 20 to 60 percent of the caseinate in an imitation cheese product without adversely affecting melt properties. The soy isolates are reported to be free of soy protein hydrolyzates.

U.S. Pat. No. 4,556,569 (Dec. 3, 1985) provides a cheese analog product using vegetable protein (e.g., soy protein). The product is made form soy milk, vegetable oil, dairy whey, caseinate, and water. U.S. Pat. No. 5,858,449 (Jan. 12, 1999) provides a isoflavone-enriched soy protein product which can be used as an ingredient in cheese products (as well as other food products).

Although theses methods generally provide cheese type products, it is still desirable to provide cheeses, especially natural cheese, containing soy protein which more closely mimic cheese prepared from dairy products. The present invention provides organoleptically pleasing cheese products, including natural cheeses, having significant levels of soy protein.

SUMMARY OF THE INVENTION

The present invention relates generally to a method for preparing cheeses, preferably natural cheeses, containing significant levels of soy protein. The process uses enzymes (preferably proteinase) to treat the soy ingredients and to form soy protein hydrolyzates. The enzyme-treated soy ingredients are complexable with casein micelles. After a heat treatment step to deactivate the enzymes, the soy protein hydrolyzate is added to a milk substrate which is then clotted, preferably using conventional rennet in combination with direct acidification or lactic acid-producing cultures, to form curds and whey. After separating the curds and whey, the curd is converted to cheese using conventional cheese-making procedures. Without the initial enzyme treatment, the intact soy ingredients would interfere with milk clotting, thereby preventing the formation of a normal cheese curd. Additionally, without the initial enzyme treatment, a significant portion of the intact soy ingredients would be lost with the whey. The partially hydrolyzated soy protein used in the present invention does not significantly interfere with milk clotting mechanisms. The partially hydrolyzated soy protein used in the present invention also tends to complex with casein, thereby leading to improved soy protein retention in the curd. Cheeses containing up to about 30 percent soy ingredients can be obtained.

The present invention provides a method for preparing a cheese containing soy proteins, said method comprising: (1) mixing soy flour with water to make a soy paste; (2) treating the soy paste with a proteolytic enzyme to form a hydrolyzed soy ingredient; (3) heating the hydrolyzed soy ingredient to a temperature sufficient to deactivate the proteolytic enzyme; (4) forming a milk substrate comprising milk and the deactivated, hydrolyzed soy ingredient; (5) treating the milk substrate to form curds and whey; (6) separating the curds from the whey; and (7) treating the curds to produce the cheese containing soy proteins. Preferably the milk substrate has a pH of about 4.0 to about 6.8 and is treated with a coagulating agent to form the curds and whey. Suitable coagulating agents include, but are not limited to, rennet, chymosin from non-animal sources, and other milk-clotting proteases.

The present invention also provides a method for preparing a cheese containing soy protein, said method comprising: (1) mixing hydrolyzed soy protein with milk to form a milk substrate; and (2) treating the milk substrate at a temperature and for a time sufficient to produce the cheese containing soy protein. Preferably the milk substrate also contains an acidifying agent and/or a clotting agent.

The present invention also provides cheese, including natural cheese, containing up to about 30 percent soy proteins, wherein the cheese is prepared by a method comprising: (1) mixing soy flour with water to make a soy paste; (2) treating the soy paste with a proteolytic enzyme to form a hydrolyzed soy ingredient; (3) heating the hydrolyzed soy ingredient to a temperature sufficient to deactivate the proteolytic enzyme; (4) forming a milk substrate comprising milk and the deactivated, hydrolyzed soy ingredient; (5) treating the milk substrate to form curds and whey; (6) separating the curds from the whey; and (7) treating the curds to produce the cheese containing soy proteins. Preferably the milk substrate has a pH of about 4.0 to about 6.8 and is treated with a coagulating agent to form the curds and whey. Suitable coagulating agents include, but are not limited to, rennet, chymosin from non-animal sources, and other milk-clotting proteases.

The present invention also provides cheese, including natural cheese, containing up to about 30 percent soy proteins, wherein the cheese is prepared by a method comprising: (1) mixing hydrolyzed soy protein with milk to form a milk substrate; and (2) treating the milk substrate at a temperature and for a time sufficient to produce the cheese containing soy protein. Preferably the milk substrate also contains an acidifying agent and/or a clotting agent. Preferably the soy-protein containing cheeses of this invention are natural cheeses which contain about 3 to about 30 percent soy protein.

DETAILED DESCRIPTION OF THE INVENTION

Figure 1:
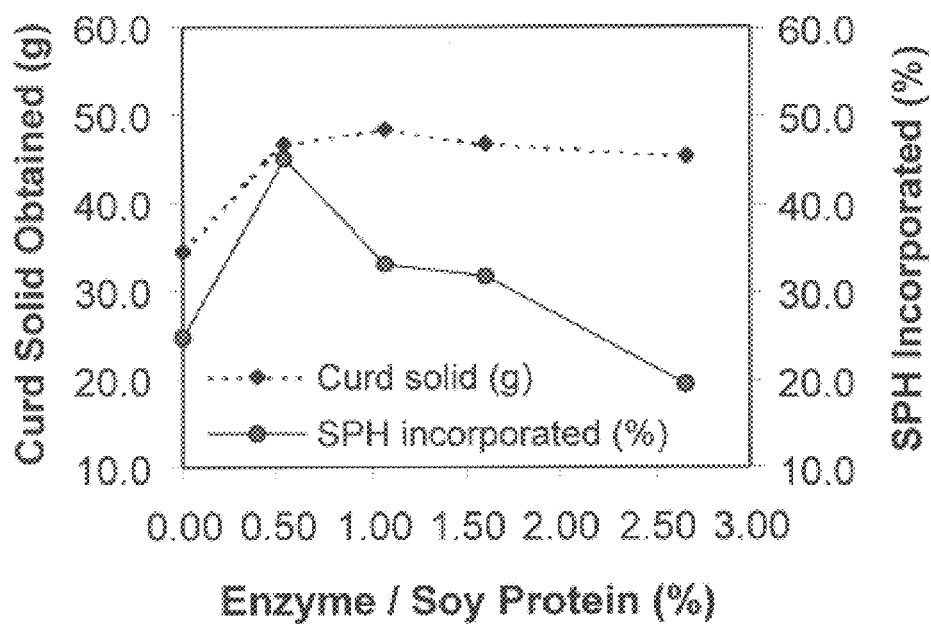
FIG. 1 provides a graph showing the effect of enzyme dosage or concentration on curd solids produced and the amount of soy protein hydrozylate incorporated in the curd as a function of the level of soy protein based on the data in Table 4 in the specification. Percentage enzyme is based on the total weight of the soy protein in the soy paste and enzyme.

This invention relates to a method for preparing cheeses, preferably natural cheeses, containing significant levels of soy protein. This invention also relates to cheese, including natural cheese, containing up to 30 percent soy protein. Central to the success of the invention is the use of soy proteins that have been treated with proteolytic enzymes to form a soy protein hydrolyzate. The soy protein hydrolyzate complexes with casein micelles to produce a soy incorporated natural cheese. If left untreated (i.e., no hydrolysis), the intact soy protein would interfere with milk clotting thereby preventing the formation of cheese curd.

For purposes of this invention, "conventional cheese-making procedures" relates to one or more processes used to make natural cheese. Generally, such a process comprises the steps of developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a lengthy period of time under controlled conditions. Cheddar cheese, for example, is cured for a period of at least four months and may be cured for a period in excess of one year to obtain the full flavor desired in cheddar cheese.

As used herein, "soy flour" relates generally to any source of soy protein made from defatted soy flakes, such as soy flours and grits, soy protein concentrates, soy protein isolates, and/or soy milk concentrates.

As used herein, "proteolytic enzyme" relates to an enzyme used in the hydrolysis of proteins or peptides to form simpler and more soluble products. Examples of such proteolytic enzymes include, for example, SP 446 (Novo Nordisk, Denmark), Promod 24L (Biocatalysts Ltd., Mid Glamorgan, UK), Flavozyme (Novo Nordisk, Denmark), and the like.

As used herein, "acidifying agent" relates to any edible acid or acid-producing agent used in conventional cheese making. Preferably, the acid producing agent is a lactic-acid producing bacterial culture.

As used herein, "coagulating agent" relates to any animal derived or synthetic milk coagulating agent used in conventional cheese making. Preferred coagulating agents are rennets. Traditional cheese rennets containing chymosin are derived from extractions taken from the inner lining of the stomach of a calf. Substitutes for cheese rennets are also widely available and typically contain other forms of the enzyme chymosin or other milk-clotting proteases such as pepsin.

To prepare the soy containing natural cheese of the present invention, a soy paste or soy protein suspension is prepared and treated with a proteolytic enzyme to produce soy proteins which may form a complex with casein micelles. The enzyme treated protein is then heated to denature the enzymes and added to milk which is then treated to form curds and whey. The whey is then separated and the curds are pressed into cheese by conventional cheese-making procedures. The whey may also be used to prepare cheese products or incorporated into cheese products if desired.

The soy paste or soy protein suspension can be prepared by simply mixing soy flour in water. Preferably, the soy paste contains about 50 to about 95 percent soy flour and, more preferably, about 65 to about 75 percent soy flour. The soy protein may be taken from any source, but is preferably a low fat soy flour. Suitable soy protein ingredients are readily available from industrial suppliers such as, for example, Iowa Soy.

About 0.02 to about 2 percent, and more preferably about 0.1 to about 1 percent of a proteolytic enzyme is added to the soy paste mixture. Examples of proteolytic enzymes that may be used in conjunction with this invention are SP 446 (glutamyl endopeptidase obtained from Bacillus licheniformis; Novo Nordisk, Denmark), CorolasePN-L (ROHM GmbH, Darmstadt), Promod 24L (Biocatalysts Ltd., Mid Glamorgan, UK), Papain 6000 (Valley Research Inc., Hammond, Ind.), and Flavozyme (Novo Nordisk, Denmark). Generally, the preferred proteolytic enzyme is Flavozyme since cheeses prepared using partially hydrolyzed soy protein prepared using this enzyme were found to exhibit superior texture and retention of soy protein in the curd. The enzyme and soy paste mixture is incubated at a temperature between about 20 to about 70° C., preferably about 50° C., for a time sufficient to provide about 5 to about 20 percent hydrolysis of the soy proteins. The degree of hydrolysis can be measured using the techniques described in Adler-Nissen, "Enzymatic Hydrolysis of Proteins for Increased Solubility," J. Agric. Food Chem., 24, 1090–96 (1976), which is hereby incorporated by reference. This incubation period allows for the formation of the soy protein hydrolyzates. Generally, an incubation period of about 0.5 to about 6 hours, and preferably about 2.5 hours, is sufficient. To stop proteolysis, the mixture is heated to a temperature of about 65 to about 95° C., preferably about 80° C., for about 5 to about 30 minutes, preferably about 10 minutes, in order to denature or deactivate the enzymes.

About 3 to about 30 percent (preferably about 5 to about 15 percent) of the deactivated hydrolyzed soy ingredient is added to a milk substrate mixture containing about 0.1 to about 0.3 percent lactic acid producing culture. Preferably, the milk substrate contains about 98 to about 99.8 percent milk, about 0.02 to about 0.1 percent calcium chloride, and about 0.1 to about 0.3 percent lactic acid producing culture. The mixture is then incubated between about 10 and 60 minutes, preferably about 30 minutes at a temperature between about 30 and 37° C., preferably about 31 to about 32° C. Next, rennet (generally about 0.02 to about 0.1 percent) is added and the sample is further incubated between about 10 and 60 minutes, preferably about 30 minutes, at a temperature between about 30 and 37° C., preferably about 31 to about 32° C. The addition of a coagulating agent, preferably rennet, causes the milk to coagulate into curds; once formed, the curds are cut and the mixture is incubated with increasing temperature (i.e., from about 30 to about 42° C. and preferably from about 31 to about 39° C.) for between about 10 and about 60 minutes, preferably about 30 minutes. The whey is then separated. After adding about 1 to about 4 percent salt (preferably about 1.5 to about 2.5), the curd pressed into cheese using conventional cheese making procedures.

The resulting cheese contains up to 30 percent soy protein when tested by means of Lowry assay or other protein detection methods known in the art. (The Lowry assay is described in Lowry et al., "Protein Measurement with Folin Phenol Reagent," J. Biol. Chem. 193, 265–275 (1951), which is hereby incorporated by reference.) Preferably the resulting cheese contains about 5 to about 15 percent soy.

EXAMPLES

The following examples are included to illustrate the invention and not to limit it. Unless otherwise stated, all percentages are by weight.

Example 1

This example illustrates the effect of different enzymes on the incorporation of soy ingredients in the natural cheese of the present invention. Low fat soy flour (100 g; 20 PDI from Iowa Soy) was mixed with 300 g water at about 50° C. to make a soy paste. Various protease enzymes (see Table 1) were then added to aliquots of the soy paste (90 g); the samples were incubated at 50° C. for about 2.5 hours. After incubation, the samples were heated to 80° C. for about 10 minutes in order to inactivate the enzymes. The total reaction time in Table 1 was measured from the addition of the enzyme until beginning of the inactivation period; proteolytic reactions, however, likely continued until complete inactivation occurred. The hydrolyzed soy ingredient samples so produced could be used to make natural cheeses.

TABLE 1

Preparation of Soy Protein Hydrolysate

| Enzyme | Amount (%) | Total Reaction Time (min.) | Final pH |
| --- | --- | --- | --- |
| none (control) | 0 | 160 | 6.56 |
| SP 446 | 0.25 | 120 | 6.48 |
| Corolase | 0.44 | 168 | 6.45 |
| Promod 24L | 0.44 | 164 | 6.32 |
| Papain | 0.44 | 160 | 6.39 |
| Flavozyme | 0.55 | 156 | 6.21 |

Whole milk (4.0 kg), 0.25 ml of Cal-Sol (45% $CaCl_2$ from Chr. Hansen Inc., Milwaukee, Wis.), and 0.52 g of lactic culture (CH-N22, Chr. Hansen Inc., Milwaukee, Wis.) was mixed at 31° C. to provide a milk substrate. Hydrolyzed soy ingredient (45 g) was then mixed into 400 g milk substrate samples and incubated for 30 minutes at 31° C. Rennet (50 mL; 100% undiluted chymosin solution, Chr. Hansen Inc.) was added to each sample with mixing and incubated at 31° C. for an additional 30 minutes. After setting, the curd was cut and incubation was continued with the temperature increased from 31 to 39° C. over 30 minutes. After decanting the whey, the curd was collected and drained using cheesecloth. The protein content of the whey was measured using the Lowry assay.

The results are shown in Table 2. The enzyme used for preparing soy protein hydrolysate significantly affect the curding process and the incorporation of soy protein into cheese curd. Indeed, the addition of soy paste (without any treatment) disturbed the rennet curding process to the extent that no curd was formed even after 60 minutes (sample #2). Thus, the soy paste should be treated prior to addition to the milk.

TABLE 2

Effect of Various Enzymes

| Sample No. | Enzyme | Wet Curd[1] (g) | Curd Moisture[2] (%) | Curd Solid (g) | Protein in Whey (%) | Protein in Whey (g) |
|---|---|---|---|---|---|---|
| 1 | none | 74 | 61.1 | 28.8 | 0.78 | 2.54 |
| 2 | none | 0 | — | — | — | — |
| 3 | SP466 | 84 | 59.9 | 33.7 | 1.64 | 5.92 |
| 4 | Corolase | 96 | 66.8 | 31.9 | 2.44 | 8.51 |
| 5 | Promod 24L | 94 | 65.9 | 32.1 | 1.84 | 6.46 |
| 6 | Papain | 88 | 61.9 | 33.5 | 1.59 | 5.68 |
| 7 | Flavozyme | 89 | 59.8 | 35.8 | 1.36 | 4.84 |

[1]Not pressed.
[2]Determined in microwave dryer operated at 80% power.

Among the five proteases tested, Flavozyme produced the best curd texture, lowest curd moisture content, and most protein retained in the curd. Assuming that the whey protein retained in the soy-added samples is approximately the same as that in the control sample (2.54 g), only about 2.40 g of soy proteins were lost to the whey for the flavozyme treated sample and, therefore, about 59 percent soy proteins should be retained in the cheese curd. In addition to the incorporation of soy protein and/or protein hydrolysate, other non-protein components were also incorporated into cheese curd. The increased curd solids, thus, resulted from the incorporation of both soy protein hydrolysate as well as other non-protein components from soy paste.

Example 2

This example illustrates the effect of the amount of enzyme addition and, thus, the degree of protein hydrolysis on natural cheeses produced by the present method.

Various soy protein hydrolysates were prepared essentially as described in Example 1 using various levels of Flavozyme (Novo Nordisk, Denmark). The soy-incorporated cheese was prepared using the soy protein hydrolystates essentially as described in Example 1 except that milk and soy protein hydrolystate samples were homogenized for about two minutes prior to addition of rennet. The results are shown in Table 3 and are plotted in FIG. 1.

poration of soy proteins into cheese curd. As shown in FIG. 1, for maximum incorporation of soy protein in the curd, the ratio of enzyme to soy protein (not soy total powder) should less than about 99 under these reaction conditions.

The soy protein incorporated curd had synthesis properties similar to conventional curd. Therefore, a conventional process can easily remove whey to reach target moisture in the final product. The soy protein incorporated curd, however, has a tofu-like texture (depending on the quantity of soy proteins incorporated).

Figure 2:
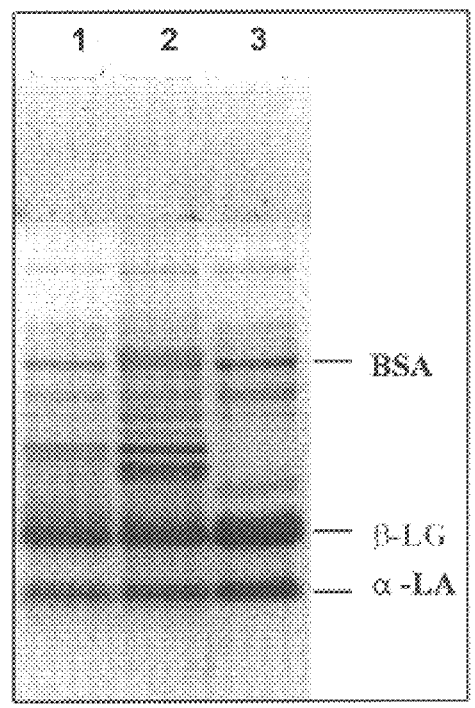
FIG. 2 provides the protein profile of whey recovered using a tricine-SDS-PAGE gel. Lane 1 is Sample No. 5 from Table 4 (enzyme-treated soy protein); lane 2 is Sample No. 1 from Table 4 (control with added soy paste but no enzyme); and lane 3 is milk only (no added soy or enzyme components).

FIG. 2 shows the protein profile of whey samples recovered from different treatments. Lane 1 is whey recovered from the sample with the addition of enzyme treated soy protein hydrolyzate (sample 5); Lane 2 is whey recovered from the control sample with the addition of non-enzyme treated soy protein hydrolyzate (sample 1); Lane 3 is conventional whey sample without the addition of soy proteins. Whey recovered from the sample with non-enzyme treated soy proteins contains more protein bands (lane 2) compared to that treated with protease (lane 1). At the sample loading level, lane 2 also contains more proteins than lane 1. There were no detectable low molecular weight soy protein hydrolysates in the whey recovered. The SDS-PAGE further confirms that the partial hydrolysis of soy proteins resulted in less protein lost in the whey.

What is claimed is:

1. A method for preparing a cheese containing soy proteins, said method comprising:

TABLE 4

Effect of Enzymes Amount

| Sample No. | Enzyme Amount[1] (%) | Wet Curd[2] (g) | Curd Moisture[3] (%) | Curd Solid (g) | Protein in Whey[4] (g) | Soy Protein Hydrolysate Incorporated in Curd (%) |
|---|---|---|---|---|---|---|
| 1 | 0 | 79.1 | 56.6 | 34.5 | 7.6 | 24.7 |
| 2 | 0.067 | 95.6 | 51.2 | 46.7 | 6.8 | 44.9 |
| 3 | 0.13 | 103.1 | 53.0 | 48.4 | 7.2 | 33.1 |
| 4 | 0.20 | 98.6 | 52.7 | 46.7 | 7.3 | 31.6 |
| 5 | 0.33 | 104.5 | 56.8 | 45.1 | 7.8 | 19.4 |

[1]Based on total weight of soy paste and enzyme.
[2]Not pressed.
[3]Determined in microwave dryer operated at 80% power.
[4]Kjedahl assay.

These results indicate that partially hydrolyzed soy protein can be incorporated into cheese curd. Based on the proteins in the recovered whey, up to 45 percent of soy proteins were incorporated into cheese curd. Extensive proteolysis, however, can result in reduced levels of incor- (1) mixing soy flour with water to make a soy paste;
(2) treating the soy paste with a proteolytic enzyme to form a hydrolyzed soy ingredient;
(3) heating the hydrolyzed soy ingredient to a temperature sufficient to deactivate the proteolytic enzyme;

(4) forming a milk substrate comprising milk and the deactivated, hydrolyzed soy ingredient;

(5) treating the milk substrate to form curds and whey;

(6) separating the curds from the whey; and (7) treating the curds to produce the cheese containing soy proteins.

2. The method of claim, 1 wherein the milk substrate has a pH of about 4.0 to about 6.8 and wherein the curds and whey are formed by treating the milk substrate with a coagulating agent.

3. The method of claim 2, wherein the cheese contains about 3 to about 30 percent soy proteins.

4. The method of claim 2, wherein the cheese is a natural cheese.

5. The method of claim 3, wherein the cheese is a natural cheese.

6. The method of claim 2, wherein the coagulating agent is rennet and wherein the milk substrate is treated with the coagulating agent at a temperature of about 30 and 37° C. for about 10 to about 60 minutes.

7. The method of claim 3, wherein the coagulating agent is rennet and wherein the milk substrate is treated with the coagulating agent at a temperature of about 30 and 37° C. for about 10 to about 60 minutes.

8. The method of claim 4, wherein the coagulating agent is rennet and wherein the milk substrate is treated with the coagulating agent at a temperature of about 30 and 37° C. for about 10 to about 60 minutes.

9. A method for preparing a cheese containing soy protein, said method comprising:

(1) mixing hydrolyzed soy protein with milk to form a milk substrate; and (2) treating the milk substrate at a temperature and for a time sufficient to produce the cheese containing soy protein.

10. The method of claim 9, wherein the milk substrate also contains an acidifying agent and a clotting agent.

11. The method of claim 10, wherein the cheese containing soy protein contains about 3 to about 30 percent soy proteins.

12. The method of claim 11, wherein the cheese containing soy protein is a natural cheese.

13. A soy protein-containing cheese prepared by a method comprising:

(1) mixing soy flour with water to make a soy paste;

(2) treating the soy paste with a proteolytic enzyme to form a hydrolyzed soy ingredient;

(3) heating the hydrolyzed soy ingredient to a temperature sufficient to deactivate the proteolytic enzyme;

(4) forming a milk substrate comprising milk and the deactivated, hydrolyzed soy ingredient;

(5) treating the milk substrate to form curds and whey;

(6) separating the curds from the whey; and (7) treating the curds to produce the soy protein-containing cheese.

14. The soy protein-containing cheese of claim 13, wherein the milk substrate has a pH of about 4.0 to about 6.8 and wherein the curds and whey are formed by treating the milk substrate with a coagulating agent.

15. The soy protein-containing cheese of claim 14, wherein the cheese contains about 3 to about 30 percent soy proteins.

16. The soy protein-containing cheese of claim 14, wherein the cheese is a natural cheese.

17. The soy protein-containing cheese of claim 15, wherein the cheese is a natural cheese.

18. The soy protein-containing cheese of claim 14, wherein the coagulating agent is rennet and wherein the milk substrate is treated with the coagulating agent at a temperature of about 30 and 37° C. for about 10 to about 60 minutes.

19. The soy protein-containing cheese of claim 15, wherein the coagulating agent is rennet and wherein the milk substrate is treated with the coagulating agent at a temperature of about 30 and 37° C. for about 10 to about 60 minutes.

20. The soy protein-containing cheese of claim 16, wherein the coagulating agent is rennet and wherein the milk substrate is treated with the coagulating agent at a temperature of about 30 and 37° C. for about 10 to about 60 minutes.

21. A soy protein-containing cheese prepared by a method comprising:

(1) mixing hydrolyzed soy protein with milk to form a milk substrate; and (2) treating the milk substrate at a temperature and for a time sufficient to produce the soy protein-containing cheese.

22. The soy protein-containing cheese of claim 21, wherein the milk substrate also contains an acidifying agent and a clotting agent.

23. The soy protein-containing cheese of claim 22, wherein the soy protein-containing cheese contains about 3 to about 30 percent soy proteins.

24. The soy protein-containing cheese of claim 23, wherein the soy protein-containing cheese is a natural cheese.

* * * * *

UNITED STATES PATENT AND TRADEMARK OFFICE
CERTIFICATE OF CORRECTION

PATENT NO. : 6,455,081 B1
DATED : September 24, 2002
INVENTOR(S) : Xiao-Qing Han It is certified that error appears in the above-identified patent and that said Letters Patent is hereby corrected as shown below:

<u>Title page,</u>
Item [75], Inventors, change "Xiao-Cing" to -- Xiao-Qing --.

<u>Column 9,</u>
Line 7, change "claim, 1" to -- claim 1 --.
Lines 19, 23 and 27, change "and" to -- to about --.

<u>Column 10,</u>
Line 21, change "and" to -- to about --.
Line 25, change "and" to -- to about --. (both occurrences)

Signed and Sealed this

Fourth Day of May, 2004

JON W. DUDAS
*Acting Director of the United States Patent and Trademark Office*